Dec. 12, 1933.       C. C. WALLACE       1,938,988
AUTOMATIC FILLING PLUG
Filed April 15, 1929

WITNESS:

INVENTOR
Curtis C. Wallace
BY
Augustus B. Stoughton
ATTORNEYS.

Patented Dec. 12, 1933

1,938,988

UNITED STATES PATENT OFFICE 1,938,988

AUTOMATIC FILLING PLUG

Curtis C. Wallace, Philadelphia, Pa.

Application April 15, 1929. Serial No. 355,095

5 Claims. (Cl. 137—68)

My invention relates to filling plugs for storage batteries.

More especially it relates to provisions for automatically filling the cells of a storage battery. This is accomplished by providing horns on the filling plugs to which suitable tubes may be attached connecting the plugs of the various cells. Water or electrolyte can then be introduced into all the cells of a battery by a single operation. When all the cells are filled the overflow from the end cell indicates that fact.

One feature of my invention is that the top of the plug is mounted so as to freely swivel.

Still another feature of my invention is that the bottom of the filling plug is provided with a flange which prevents electrolyte from blocking the vent hole in the plug and this giving a false indication.

For a more complete exposition of my invention reference may be had to the annexed drawing and specification at the end whereof my invention will be more particularly pointed out and claimed.

Figure 2:
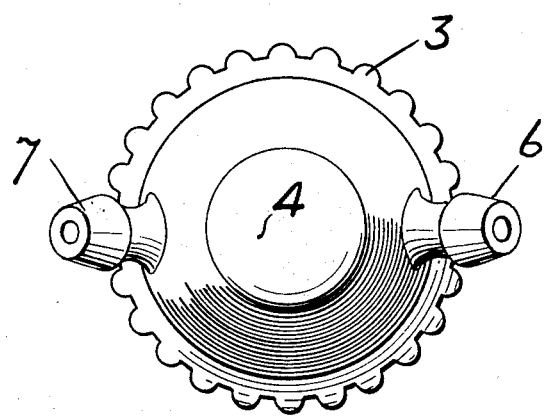
Figure 2 is a plan view of the improved vent plug.
Figure 1:
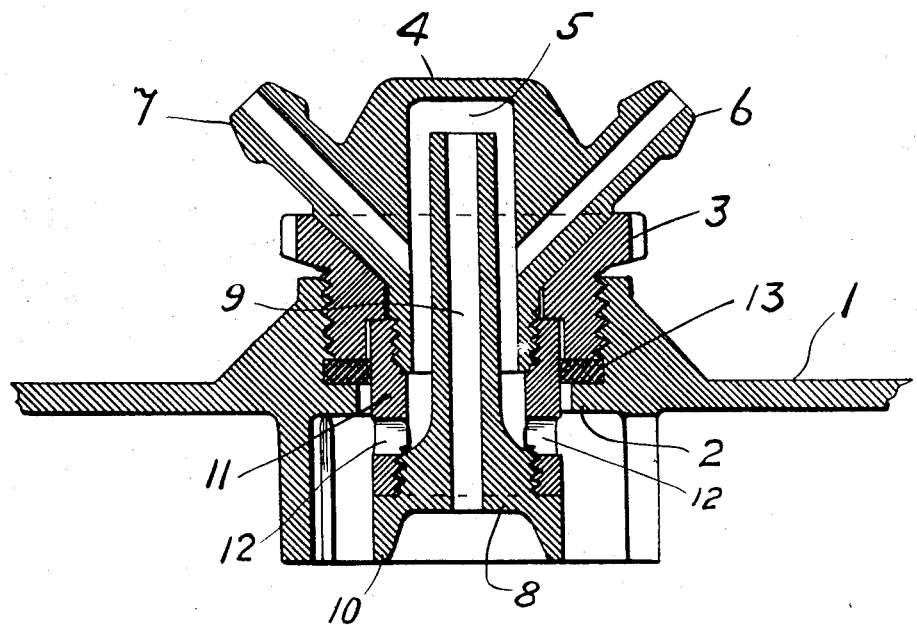
Figure 1 is a cross section through a cell cover and a vent plug constructed according to my invention.

In the drawing, 1 represents a cell cover of a storage battery which has a screw threaded aperture therein. At the bottom of this aperture is arranged a shoulder 2.

To cooperate with and normally close this aperture I provide a vent plug made up of the following elements: Adapted to engage in the aperture in cover 1, there is provided cap 3 which has a central aperture therein. Located in this aperture is a top 4 which is also provided with a central aperture 5 and with horns 6 and 7. Horns 6 and 7 are arranged at an angle to the axis of top 4 and are perforated to provide a communication with aperture 5. One of these horns acts as an inlet duct and the other as an overflow duct.

Cooperating with top 4 is bottom 8 which is pierced by a central bore 9 and which has at its lower end a depending flange or skirt 10. This flange serves to provide drainage for drops of electrolyte which might otherwise collect in the bore 9, and normally prevents the level of the liquid from rising above its lower rim.

In order to attach the top and bottom portions together there is provided a tubular connection 11 which has perforations 12 therein. The upper end of connection 11 is threaded for a short distance to receive the lower end of top 4. The thread in the upper end of connection 11 is proportioned so that when top 4 is screwed completely in, cap 3 is loosely held between connection 11 and top 4 so as to be freely rotatable thereon.

Washer 13 of pliable material such as soft rubber is provided on the shoulder 2 and is of such a size as to closely embrace connection 11. When cap 3 is screwed into cover 1 washer 13 thus provides a gas tight joint.

In the operation of my device suitable tubes are connected to horns 6 and 7 so as to join the various cells of a storage battery. Water or electrolyte is then introduced through the tube attached to one of the horns and owing to the sloping axis of the horn flows from the aperture 5 through the perforations 12 and fills the cell of a storage battery. At the same time gas escapes through bore 9 and out the opposite horn. When the electrolyte in the cell has risen to the desired level, which is the level of the lower rim of flange 10, no more liquid can flow into the cell on account of the back pressure of the gas in the space above the electrolyte which cannot now escape through the bore 9. Instead the fluid being introduced flows through the compartment 5 and out through the perforation in the opposite horn. This operation continues until all the storage battery cells are filled to the desired level when the overflow from the end horn indicates this fact.

The flange 10 is provided so that when the level of the electrolyte falls away from the bore 9 there will be no tendency for drops of electrolyte to collect in the bore and clog it so as to prevent the escape of gas and thus cause fluid to flow into the adjoining cell before the first cell is completely filled.

The advantage of swiveling the top 4 in the cap 3 is to permit the horns 6 and 7 to be located in any convenient angular position to avoid interference with terminal posts and intercell connectors.

I do not intend to be limited in the practice of my invention save as required by the prior art and the attached claims.

I claim:

1. A filling plug comprising, a cap having a central aperture, a top having perforated horns thereon disposed at an angle thereto and having a central aperture therein, a bottom having central aperture therein communicating with the central aperture in the top and having a flange on the lower end, and a tubular connection adapted to connect said top and said bottom and to hold said cap between said connection and said top so that said cap is free to rotate thereon and perforations in said connection.

2. Filling plug structure comprising, a cover having a shouldered aperture therein, a cap having a central aperture and adapted to fasten into the aperture in said cover, a top having perforated horns thereon disposed at an angle thereto and having a central aperture therein, a bottom having central aperture therein communicating with the central aperture in the top and having a flange on the lower end, a tubular connection adapted to connect said top and said bottom and to hold said cap between said connection and said top so that said cap is free to rotate thereon and perforations in said connection, and a washer adapted to fit against the shoulder in said cover and to closely embrace said connection.

3. Filling plug structure comprising a cover having a shouldered aperture therein, a filling element having a filling chamber provided with inlet and overflow ducts above the cover, a filling orifice below the cover and a venting duct communicating below with the space below the cover and above with the interior of the chamber above the inlet and overflow ducts, a cap having a central aperture, said cap being adapted to loosely fit around the filling element and adapted to fasten into the aperture of the cover, and a pliable washer adapted to fit snugly around the filling element and provide a gas-tight seal between the cap and the shoulder.

4. A cell cover having an aperture interiorly screw threaded and provided with an internally projecting flange below the threaded portion; a filling and venting element located in the aperture having a lower cylindrical portion loosely fitting within the flange and having a filling chamber communicating with the interior of the cell through openings below the cover and above the normal liquid level and having inlet and outlet ducts for the filling chamber and having also a separate vent duct terminating at its lower end at the liquid level and at its upper end in the filling chamber above the inlet and outlet ducts, a pliable gasket seated on the flange and closely fitting the cylindrical portion of the filling and venting element, and a sealing ring surrounding the filling and venting element threaded to engage the threads of the cover aperture and adapted to seat on the gasket.

5. A filling plug including a cap having a fastening means on its surface, a top, and a bottom, said top and said bottom having connecting means whereby said top and said bottom are fastened together to hold said cap loosely between them so that said cap is rotatable about said top and bottom.

CURTIS C. WALLACE.